Dec. 4, 1945. A. K. WATSON ET AL 2,390,479
MOBILE ACCOUNTING DEVICE
Filed July 10, 1942 2 Sheets-Sheet 2
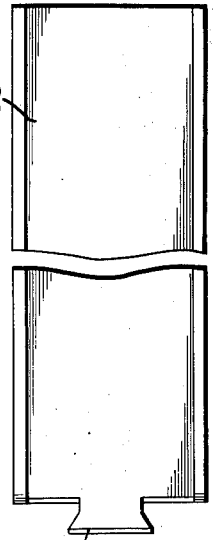
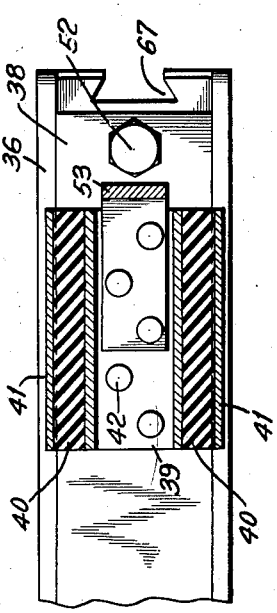
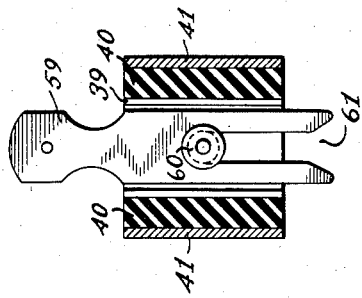
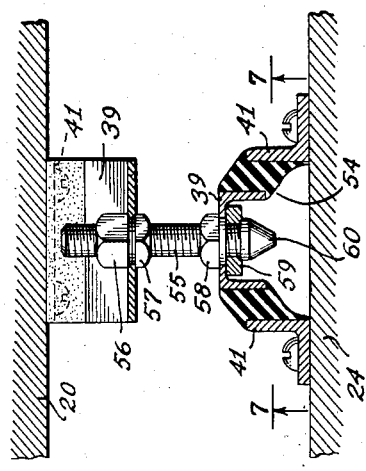
INVENTORS
Arthur K. Watson
William L. Lewis
James L. Walsh
BY
ATTORNEY.

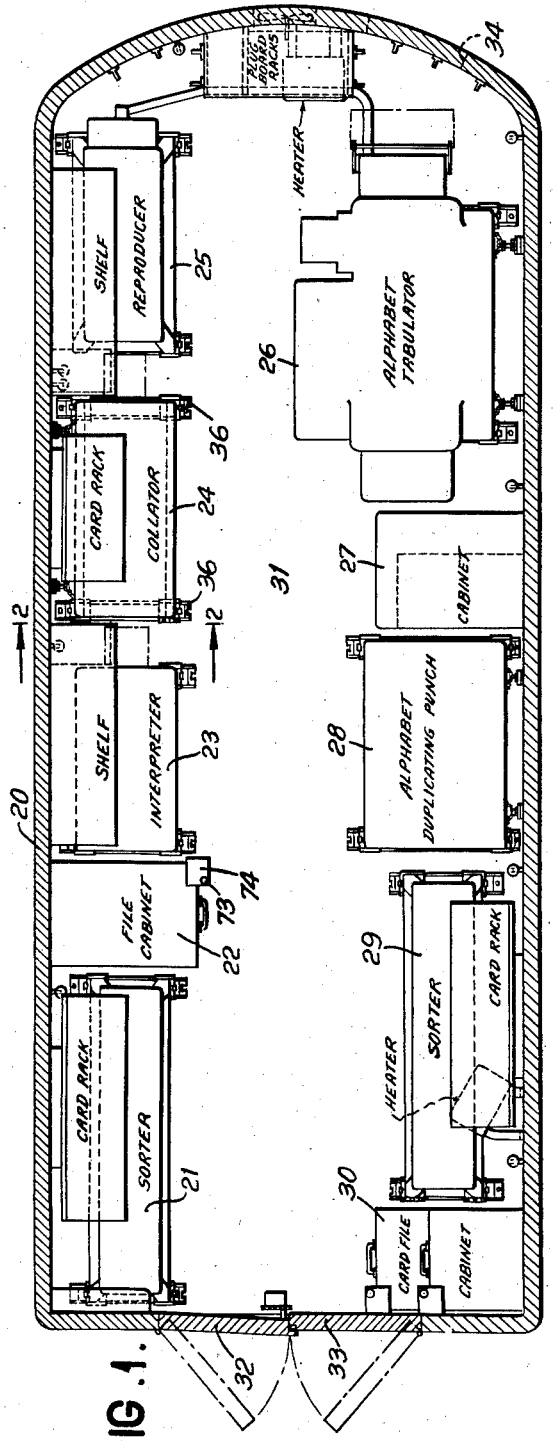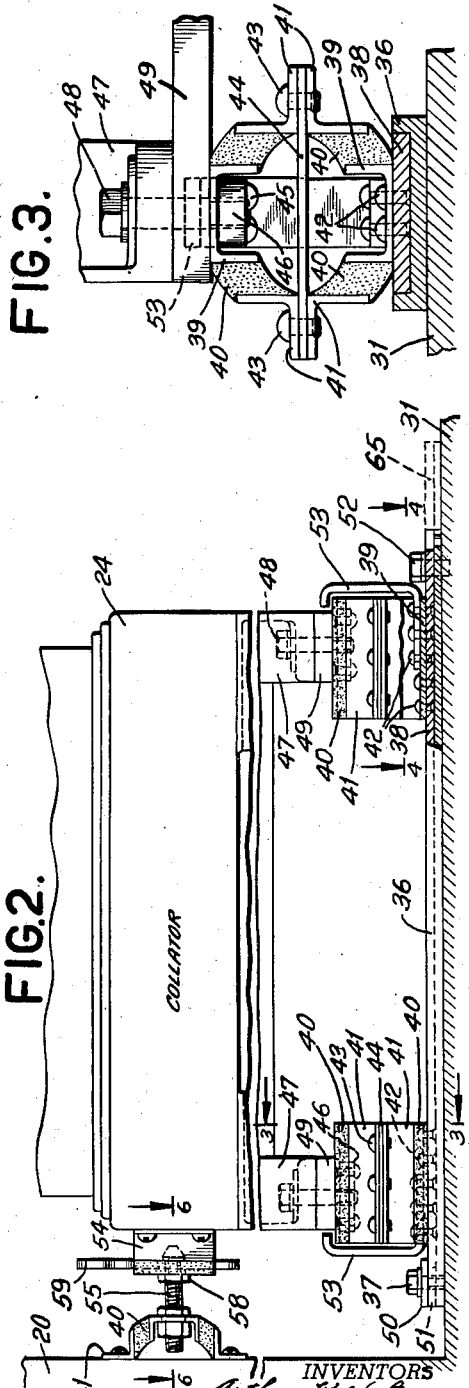

Patented Dec. 4, 1945

2,390,479

UNITED STATES PATENT OFFICE 2,390,479

MOBILE ACCOUNTING DEVICE

Arthur K. Watson, New Canaan, Conn., William L. Lewis, Binghamton, N. Y., and James L. Walsh, Washington, D. C., assignors to International Business Machines Corporation, New York, N. Y., a corporation of New York Application July 10, 1942, Serial No. 450,470

3 Claims. (Cl. 296—1)

This invention relates generally to devices adapting accounting machines for operation in vehicles, and more particularly to means for fastening tabulating equipment in trailers for military use.

An object of the invention is the provision of resilient securing devices for fastening intricate tabulating mechanisms in such a manner that the resilient devices will absorb the shocks produced by the abrupt movements of the vehicles in which they are mounted.

Another object of the invention is the provision of shock absorbing mountings which are designed to be movable so that accounting devices attached thereto may be moved away from the walls of vehicles, and they are thus made easily accessible for adjustment and servicing. In order to conserve the limited space found in an army trailer, the accounting machines are backed near the side walls of the truck and fastened there to provide the maximum amount of space between the machines attached to opposite walls. Footing skids are provided so that, when the machines are unfastened, they may be pulled out toward the center of the trailer and there changes in plugging and other adjustments may be made as well as servicing. Each skid is formed as a channel fastened to the floor at right angles to a wall. Part of the skid channel is formed as a removable extension which is put in place only when it is desired to pull a machine away from the wall. Therefore, the center of the floor is unobstructed when the machines are in normal positions, and the extending skid channels are put in place only when needed.

Another object of the invention is the provision of connections involving the use of rubber blocks on metal and resistant to shearing therefrom for connecting machines to the floor and side walls of vehicles. The floor mountings are arranged with double layers of shock absorbers attached together and placed between the feet of the machine and a rectangular bar acting as a runner held within the skid channel fastened to the floor of the vehicle. The wall mountings comprise pairs of absorbers attached to the wall and machine, respectively, between which is placed an adjustable and removable bolt acting as a swivel connection with free movement when the machine rocks vertically in the vehicle. The wall mounting is made readily detachable by the use of a keying arrangement disengaged by withdrawing a fork-shaped pin.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a plan view of the interior of the trailer showing the arrangement of the accounting machines and file cabinets around the walls.

Fig. 2 is a detail elevation view looking in the direction of the arrows 2—2 in Fig. 1 and showing the floor and wall shock absorbing mountings for a collator machine.

Fig. 3 is a detail elevation view taken along line 3—3 of Fig. 2 and showing the construction of one of the resilient mountings.

Fig. 4 is a detail sectional plan view taken along line 4—4 of Fig. 2 and showing the construction of the machine skids.

Fig. 5 is a detail view of a removable skid extension which is locked on a stationary skid channel when a machine is to be drawn out into the center of the trailer.

Fig. 6 is a sectional plan view taken along line 6—6 in Fig. 2 and showing one of the flexible wall attachments for securing an accounting machine to the side of the trailer body.

Fig. 7 is a sectional elevation view taken along line 7—7 in Fig. 6 and showing the key locking means for assembling the wall mounting.

In Fig. 1 is shown the arrangement of accounting machines and filing cabinets around the inner walls of the trailer body 20. They may be identified in the order of use in a clockwise direction starting at the upper left hand corner with a card sorter 21, a filing cabinet 22, a card interpreter 23, a card grouping collator 24, a card perforating reproducer 25, a data accumulating and report printing alphabet tabulator 26, a filing cabinet 27, a card perforating duplicating punch 28, another sorter 29, and a card file cabinet 30. At the one end of the trailer is a pair of outwardly swinging doors 32 and 33 giving access to the center of the trailer floor 31 which is normally clear since the machines are held close to the walls of the vehicle body. An emergency door 34 is provided at the opposite end of the trailer.

The various filing and card holding cabinets are secured directly to the floor of the vehicle and against the walls of the vehicle body, but the accounting machines are removably secured to the floor and walls so that they may be drawn out into the center of the vehicle for changes in plugging and adjustments as well as for servicing. Each machine is provided with four shock absorbing feet which are attached to sliding runners movably held in skid channels which are secured to the floor of the vehicle.

Referring to Figs. 2 and 3, it is seen that a skid 36 is formed as a channel which is fastened to the floor 31 of the trailer by screws or bolts or any other suitable means (not shown). These skids 36, as already explained, are arranged in pairs, one pair for each machine, and each skid is placed with a rear end near the wall of the trailer where it is fastened by a bolt 37. A related pair of skids are laid parallel and at right angles to the wall, so that the supported machine may be drawn out in a direction at right angles to the wall. Within the confines of the skid is a long runner 38 to which is attached two of the shock absorbing bases. Each absorber is in the form of a strap and comprises a U-shaped channel 39 carrying a pair of rubber blocks 40 to which are attached angle irons 41 with outwardly extending fastening legs. Both the channel and the angle irons of the absorber are perforated for the reception of rivets or bolts to hold the absorber between a stationary mounting and the object which is to ride on the absorber. In the present case, as shown in Fig. 3, a pair of absorbers are faced in opposite directions and fastened together to form a compact and strong resilient structure capable of carrying a greater load than a single one sided absorber. The lower absorber is fastened to the runner 38 by rivets 42 and the upper absorber is fastened to the lower one by rivets 43 passing through a tie plate 44 and both pairs of angle irons 41. Attached to the under side of the channel 39 of the upper absorber by rivets 45 is a threaded screw block 46 providing the means whereby one of the feet 47 of a machine may be removably attached to the absorber by a screw bolt 48 threaded to engage the screw block 46.

Between the upper absorber and the foot of the machine is placed a tie bar 49 (Fig. 3) through which the screw bolt 48 passes in securing the bottom of the machine to one of the resilient mountings. In Fig. 2 it is seen that two of such tie bars 49 are provided to connect the front pair of legs and rear pair of legs of the machine to strengthen them and counteract some of the stresses tending to loosen the legs from the base of the machine. It is also shown in Fig. 2 that the two resilient mountings associated with one side of the machine are mounted near the opposite ends of the same runner 38. The rear end of runner 38 is locked under an extension plate 50 held above the skid channel 36 by the bolt 37. Another plate or block 51 is fixed in channel 36 under bolt 37 and acts as a rearward stop to limit the rearward skidding movement of the runner 38. The front end of each runner is held in place in the skid channel 36 by a screw bolt 52 passing through the runner, the skid and the vehicle floor 31.

Attached to the channel 39 of each of the lower absorbers is an L-shaped stop or snubber 53 which has a hooked upper end reaching over in the path of the upper channel 39. Normally there is clearance between the snubber and the top of the upper absorber but, when the vehicle is in motion, there are times when an unusual movement will tend to throw the machine upward and at such times the upper channel strikes against the hooked end of stop 53 which then dampens the vibrations of the machine.

Each machine is resiliently secured to the wall of the vehicle by pairs of shock absorber mountings, such as the one shown in Figs. 2 and 6. The enlarged showing in Fig. 6 reveals that a pair of absorbers similar to those used in connection with the footing of the machine are arranged at right angles to provide a swivel mounting between the wall 20 and the machine 24. The angle irons 41 of the machine absorber 54 are attached to the machine in a vertical direction, while the angle irons 41 of the absorber attached to the vehicle wall 20 are arranged in a horizontal direction. In this way the stresses are distributed, to be taken up by the oppositely fastened absorbers.

The channels 39 of the two absorbers are arranged at right angles as shown in Fig. 6 and between them is assembled a screw bolt 55 adjustably secured to the wall absorber by a pair of tightened nuts 56 and 57. At the opposite end of screw bolt 55 is arranged a removable fastening which is made effective quickly through only a partial turning of a nut 58. The nut 58 contacts against the channel 39 of the machine absorber opposite to a slotted key 59 (Fig. 7) which passes between the pointed head 60 of the bolt and the inner wall of the channel. In Fig. 7 it is seen that the lower end of key 59 is slotted at 61, and tapered extensions provide ready assembly of the key beneath the head 60 before the nut 58 is tightened to hold the machine against the wall. The pointed head 60 of the bolt facilitates the positioning of the bolt through the opening in channel 39 when the machine is pushed back against the wall. When it is desired to pull the machine out for servicing, the nut 58 is loosened and the key 59 is lifted out behind the head 60 and then the machine absorber is free for movement while the bolt 55 remains attached to the wall absorber.

When a machine is to be drawn out to the center of the floor of the trailer, a pair of extensions are placed in front of the fixed skid channels to guide the runners 38 on the bottom of the machine. One of such extensions 65 is shown in Fig. 5. There it is seen that one end of the extension 65 is provided with a dove-tail projection 66 which matches with a recess 67 (Fig. 4) formed in the front end of the fixed skid 36. When the projection 66 is assembled in the recess 67, the bottom and side portions of extension 65 match with the channel form of skid 36, so that runner 38 passes from one to the other as the machine is drawn out from the wall. All that is required to release a machine for movement is unscrewing and removal of bolts 52, loosening of nuts 58, and removal of keys 59. The removable extensions help to keep the floor ordinarily free from obstructions so that movement of the operators from one machine to the other is facilitated in normal accounting operations.

Since the mobile unit is designed for movement over rough roads and for cross-country travel, all parts of the accounting apparatus require fastening while the vehicle is in motion. A means is provided to retain the drawers of the filing cabinets from outward movement while the vehicle is in motion. Fig. 9 illustrates a retainer provided to hold the drawers 70 of the filing cabinet 22 from outward movement. Attached to the right side wall of cabinet 22 is a hinge 71 extending along most of the vertical edge of the front end of the cabinet. Attached to the front side or flap of said hinge is an elongated plate 72 which is designed to pivot against the front side of the drawers in the cabinet 22 and hold them there when a pin 73 is dropped through a perforated plate 74 fastened on the top of the cabinet. Referring to Fig. 1, it is noted that the location of the perforation for pin 73 is designed to place the pin directly in front of plate 72 when it is swung against the front side of the drawers.

In addition to the machine carrying trailer shown in Fig. 1, another trailer is provided as an administration office wherein all information and data are analyzed and transferred to the record cards which are perforated. Other vehicles carry electric current generating equipment to furnish lighting current for the trailers and motive power for the accounting machines.

The interior of the accounting trailer is provided with two sets of lights, the ordinary illuminating bulbs and a set of darkened bulbs which are used only in those intervals when the door is opened. The alternation of lighting is automatically enforced by a door switch. Claims to such an illuminating system are presented in our divisional application Serial No. 572,066, filed January 9, 1945.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. As a means for resiliently mounting an object in a vehicle body, a skid fastened to the floor of said body and at right angles to a wall of said body, a runner movable on said skid, shock absorbing devices attached between said object and said runner, a stop on said skid to position said runner with the object near the wall, means for fastening the runner on the skid when the object is positioned, a resilient wall mounting and means for clamping said object to said wall mounting.

2. As a means for resiliently mounting an object in a vehicle body, a skid fastened to the floor of said body and at right angles to a wall of said body, a runner movable on said skid, shock absorbing devices attached between said object and said runner, a stop on said skid to position said runner with the object near the wall, means for fastening the runner on the skid when the object is positioned, a removable skid extension, said extension having a projection fitting into an opening in the end of the skid which is away from the wall, whereby the object may be drawn away from the wall over the skid and skid extension, and after the object is returned near the wall, the extension may be removed to leave the floor space unobstructed before the object.

3. A wall fastening comprising a pair of shock absorbers fastened respectively to an object and to the wall, a screw bolt between said absorbers, a pair of nuts for fastening said bolt to one of said absorbers, said bolt having a head smaller than an assembly opening in the others of said absorbers, a removable notched key fitted over said bolt between the other of said absorbers and the head of said bolt, and a third nut on said bolt for clamping said key between said head and the absorber to fasten the object to the bolt, whereby the object is readily disengaged from the wall by loosening said third nut and removing said key.

ARTHUR K. WATSON.
WILLIAM L. LEWIS.
JAMES L. WALSH.